(12) United States Patent
Lee

(10) Patent No.: US 8,291,955 B2
(45) Date of Patent: Oct. 23, 2012

(54) APPARATUS OF MANUFACTURING PIPE-SHAPED INSULATOR

(75) Inventor: Pil Se Lee, Andong-si (KR)

(73) Assignee: Sewoon T&S Co., Ltd., Youngcheon-si, Gyeongsangbuk-do (KR)

( * ) Notice: Subject to any disclaimer, the term of this patent is extended or adjusted under 35 U.S.C. 154(b) by 316 days.

(21) Appl. No.: 12/677,100

(22) PCT Filed: Jun. 30, 2008

(86) PCT No.: PCT/KR2008/003796
§ 371 (c)(1),
(2), (4) Date: Mar. 8, 2010

(87) PCT Pub. No.: WO2009/031753
PCT Pub. Date: Mar. 12, 2009

(65) Prior Publication Data
US 2010/0221376 A1 Sep. 2, 2010

(30) Foreign Application Priority Data
Sep. 5, 2007 (KR) .................. 10-2007-0090118

(51) Int. Cl.
*B32B 38/00* (2006.01)
*B32B 38/04* (2006.01)

(52) U.S. Cl. ........ 156/525; 156/510; 156/516; 156/523; 156/524

(58) Field of Classification Search .................. 156/510, 156/516, 523–525
See application file for complete search history.

(56) References Cited

U.S. PATENT DOCUMENTS

| 4,115,498 A * | 9/1978 | Kissell et al. ................. 264/119 |
| 2004/0079431 A1* | 4/2004 | Kissell ............................ 138/149 |
| 2005/0167030 A1* | 8/2005 | Davies et al. ................. 156/148 |
| 2005/0252137 A1* | 11/2005 | Bartek et al. ................... 52/518 |

* cited by examiner

*Primary Examiner* — Philip Tucker
*Assistant Examiner* — Christopher C Caillouet
(74) *Attorney, Agent, or Firm* — Lowe Hauptman Ham & Berner, LLP

(57) ABSTRACT

Disclosed is an apparatus of manufacturing a pipe-shaped insulator, wherein a thin fiberglass mat is coated, at a surface thereof, with a binder (adhesive) and is press-wound on a forming roller, so as to manufacture a pipe-shaped insulator having a predetermined thickness and a predetermined diameter. The apparatus includes a mat feeding roller, a plurality of fiberglass mat transportation rollers, a coating roller to coat a binder over a surface of the fiberglass mat, a forming roller on which the fiberglass mat, coated with the binder, is wound in plural times to form a pipe-shaped insulator, a squeeze roller disposed parallel to the forming roller, a pressure regulator to press the fiberglass mat, an encoder to measure a transported length of the fiberglass mat, a cutting unit to diagonally cut the fiberglass mat, a control system, a sensor, and a plurality of drive motors and power transmission members.

13 Claims, 6 Drawing Sheets

[Fig. 1]
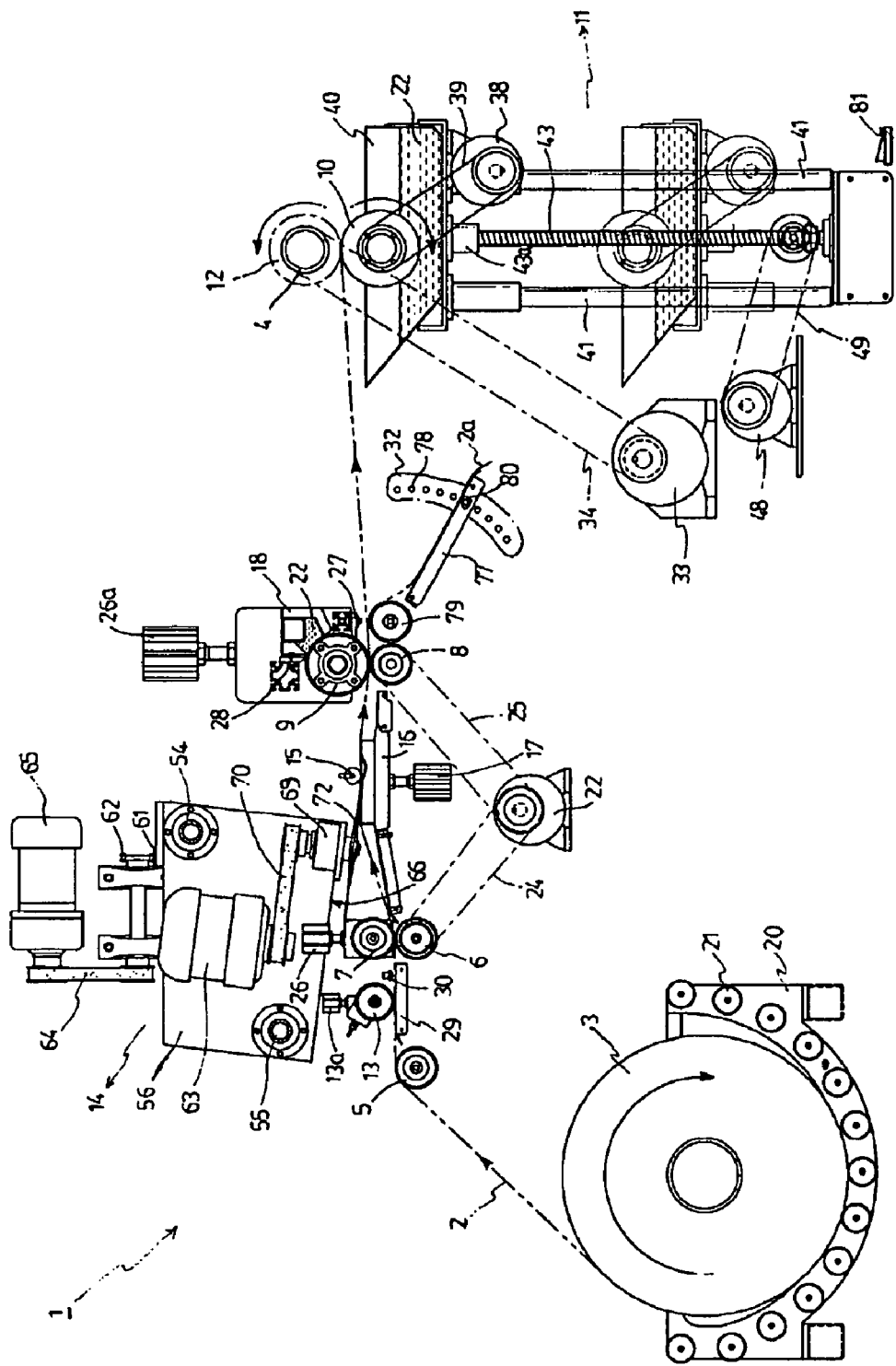

[Fig. 2]
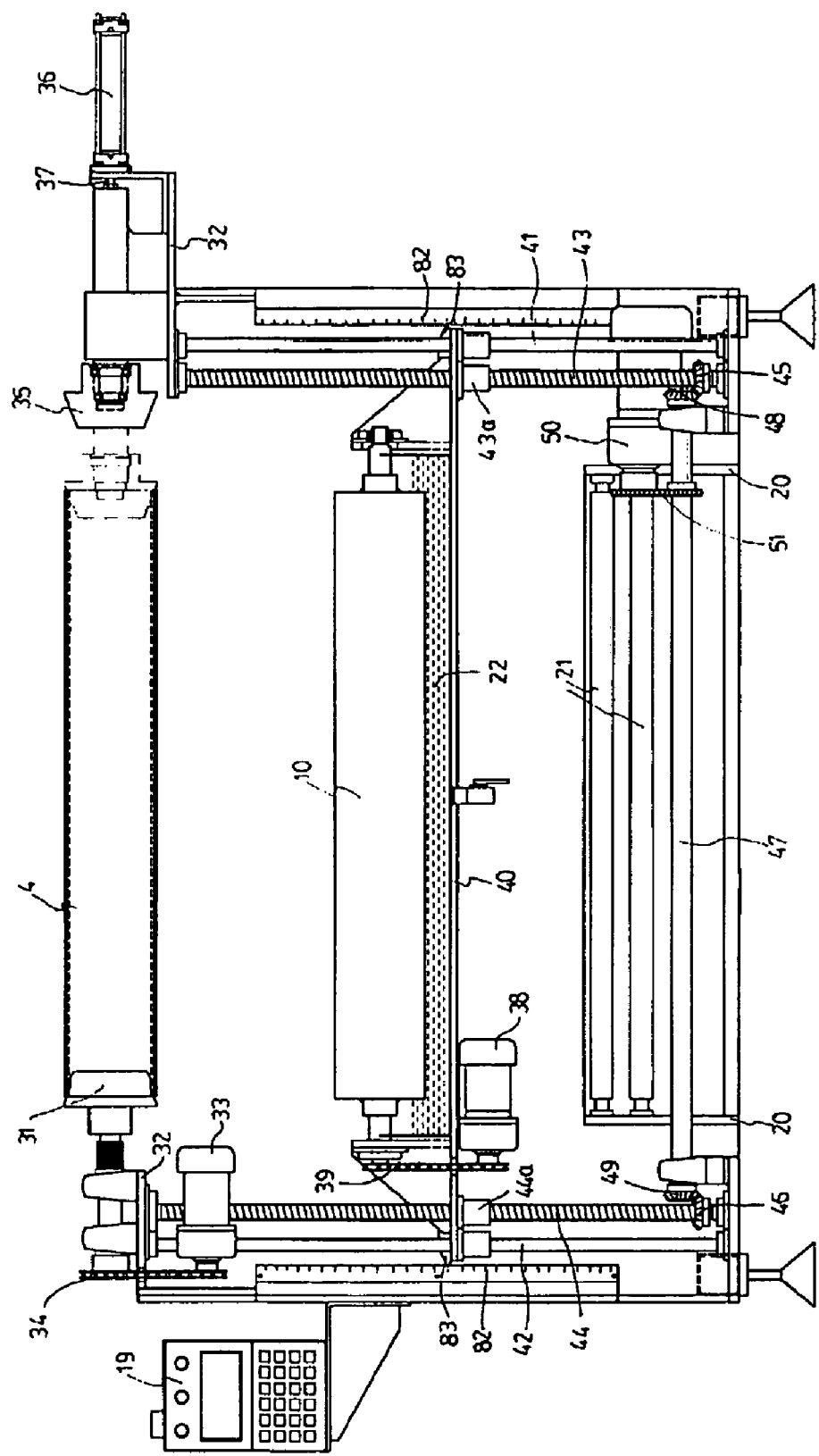

[Fig. 3]
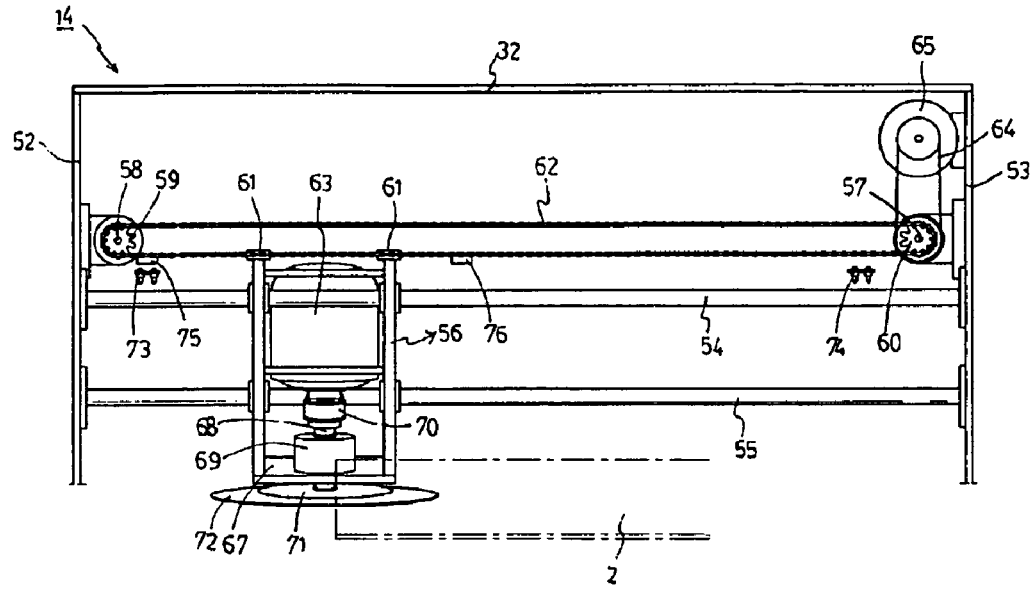
[Fig. 4]
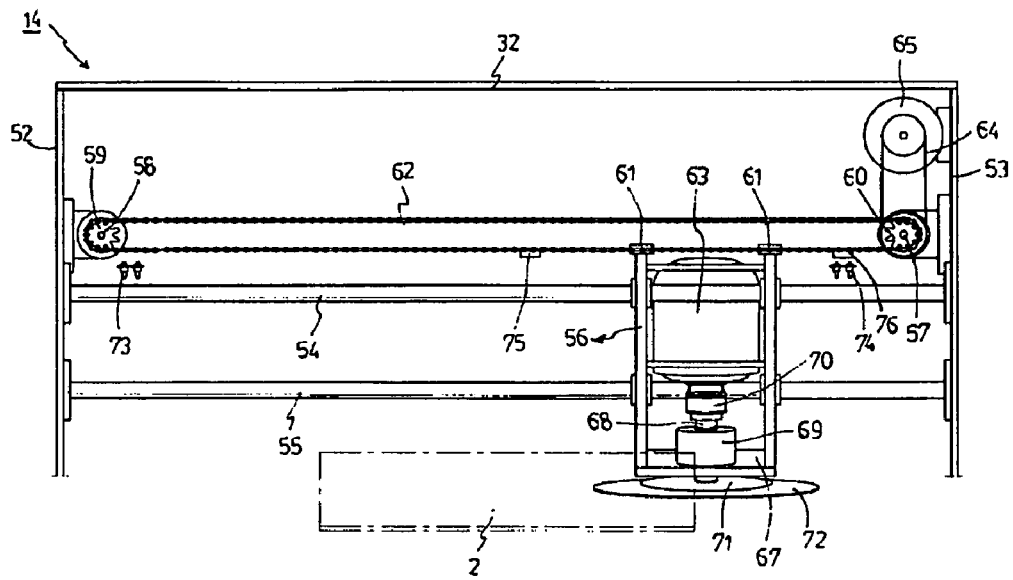

[Fig. 5]
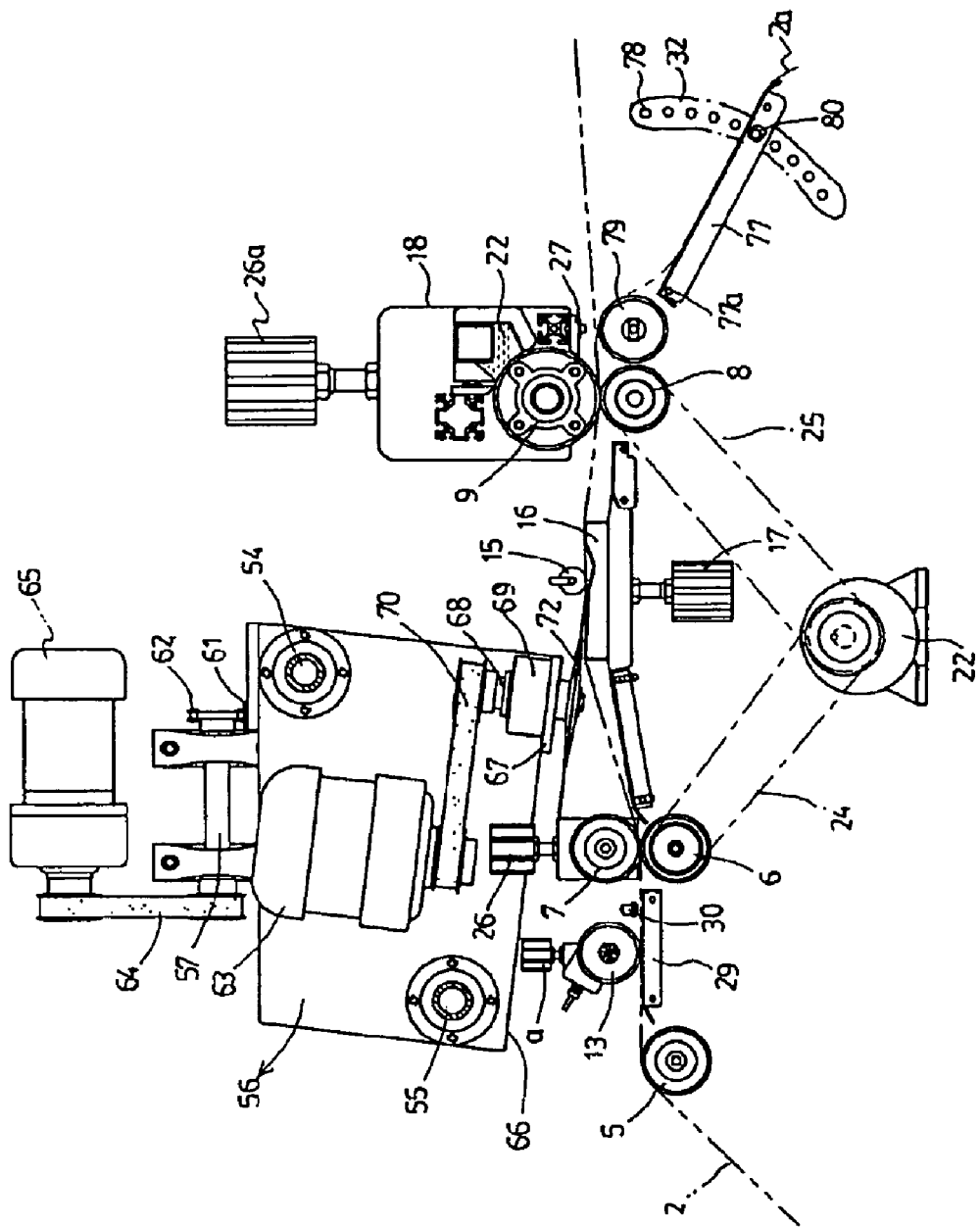

[Fig. 6]
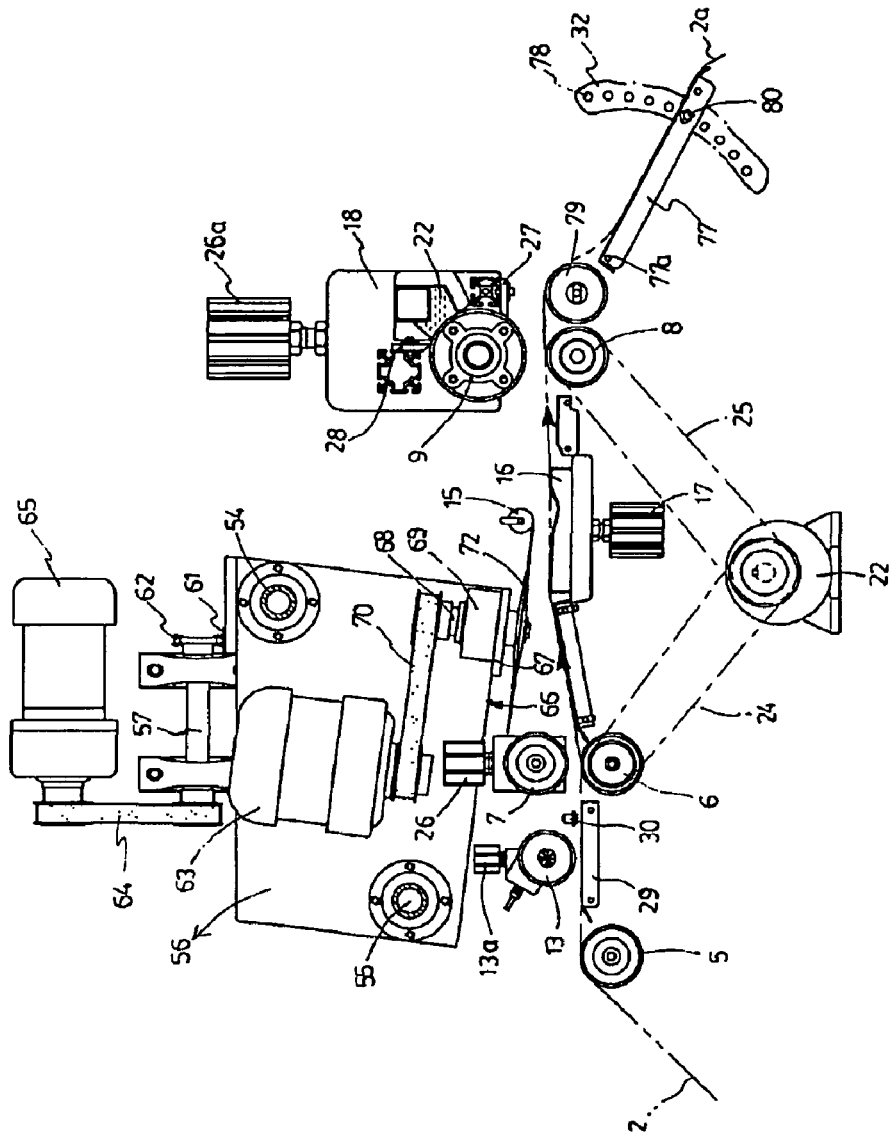
[Fig. 7]
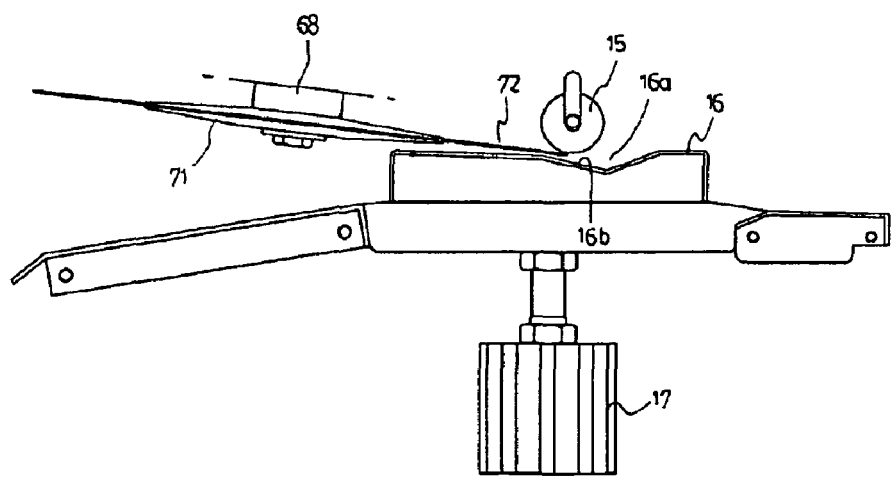

[Fig. 8]
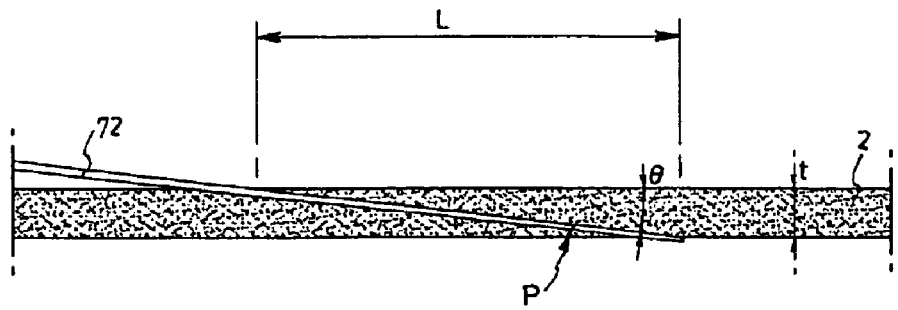
[Fig. 9]
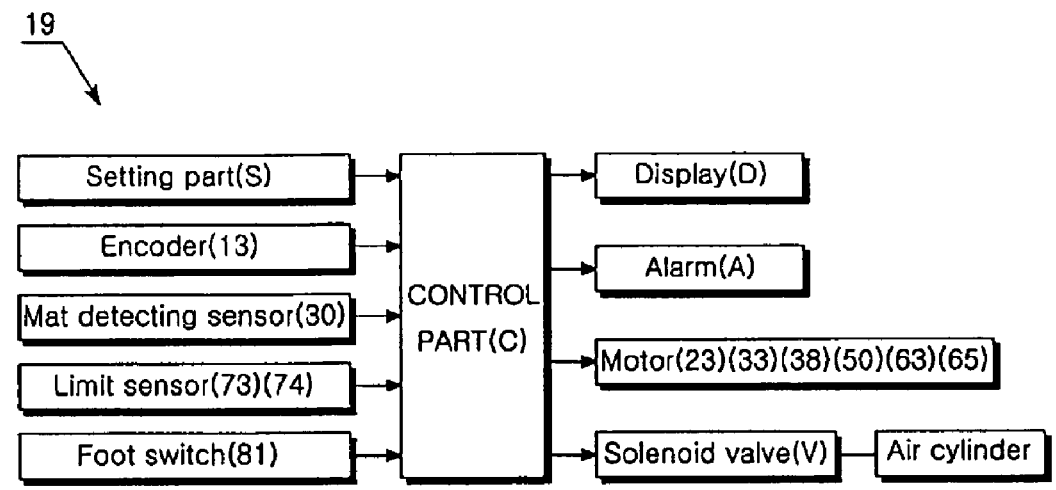

APPARATUS OF MANUFACTURING PIPE-SHAPED INSULATOR

TECHNICAL FIELD

The present invention relates to an apparatus of manufacturing a pipe-shaped insulator, wherein a thin fiberglass mat is coated, at an upper surface thereof, with a binder (i.e. an adhesive) and is press-wound on a forming roller, so as to manufacture a pipe-shaped insulator having a predetermined thickness and a predetermined diameter.

BACKGROUND ART

In general, piping of heating/cooling facilities, used in power-generation and petrochemical plants, industrial equipment, and a variety of fabrication systems and air-conditioning systems, is provided with various sizes and materials of a heat-insulating material (hereinafter, referred to as a "pipe-shaped insulator") to impede heat-exchange between the piping and the outside. Using such an insulator around piping can achieve a reduction in energy consumption and manufacturing costs of heating/cooling facilities.

Recently, for the purpose of reducing labor costs and improving productivity, a pipe-shaped insulator has been installed around heating/cooling piping via automated installation lines. This necessitates standardization of the pipe-shaped insulator, to allow the pipe-shaped insulator to be automatically inserted around heating/cooling piping.

In a conventional manufacturing process of the pipe-shaped insulator, short (monofilament) fiberglass is press-formed in a mold so as to form a pipe-shaped insulator. The resulting press-formed pipe-shaped insulator has an incomplete shape with a longitudinal cut in order to enable separation of the insulator from the mold. Then, the separated pipe-shaped insulator is subjected to bonding, thereby achieving a cylindrical finished product. However, this conventional manufacturing process cannot manufacture a completely cylindrical pipe-shaped insulator. In addition, with dependence on press-forming, the pipe-shaped insulator, made of bulky short fiberglass, confronts a degradation in binding force of texture and consequently, degradation in solidity, and moreover, has an extremely low density as compared to a product thickness.

Furthermore, the above-described conventional manufacturing process must prepare several sizes of molds according to diameters of desired pipe-shaped insulators, causing an excessive increase in manufacturing costs. Also, the resulting low-density pipe-shaped insulator suffers a serious degradation in heat-insulation efficiency. Even if the pipe-shaped insulator is manufactured to a predetermined standard using an appropriate mold, the pipe-shaped insulator is easily deformed due to the cut thereof and therefore, it is impossible to anticipate a standardized product and the pipe-shaped insulator complicates automation.

With relation to installation of the pipe-shaped insulator, the pipe-shaped insulator must first be positioned around a heating/cooling pipe via the cut in the insulator and thereafter, an outer surface of the pipe-shaped insulator must be subjected to taping as a finishing treatment. Therefore, the installation of the pipe-shaped insulator is troublesome and time consuming.

DISCLOSURE OF INVENTION

Technical Problem

Therefore, the present invention has been made in view of the above problems, and it is an object of the present invention to provide an apparatus of manufacturing a pipe-shaped insulator, wherein a fiberglass mat, which is prepared by, for example, needle punching and thus, has a relatively thin thickness, is press-wound on a forming roller so as to provide a pipe-shaped insulator having a desired thickness and desired diameter, whereby a high density pipe-shaped insulator having a remarkably improved strength and heat-insulation efficiency can be formed with low manufacturing costs.

It is another object of the present invention to provide an apparatus of manufacturing a pipe-shaped insulator, wherein a series of drawing, transportation, binder coating, press-winding, cutting, etc. of a fiberglass mat can be performed within a single apparatus, whereby a considerable reduction in production processes and lines and improved productivity via automation and standardization can be accomplished.

It is a further object of the present invention to provide an apparatus of manufacturing a pipe-shaped insulator, wherein a fiberglass mat is diagonally cut to have a wide diagonal cut plane, whereby winding beginning and ending portions of a resulting pipe-shaped insulator have no angled portion.

It is a still further object of the present invention to provide an apparatus of manufacturing a pipe-shaped insulator, wherein a squeeze roller coupled with a pressure regulator is provided close to a forming roller and is used to press a fiberglass mat wound on the forming roller so as to allow a large amount of binder to permeate the fiberglass mat, whereby a high-density pipe-shaped insulator having a considerably improved adhesive force can be accomplished and the binder can be coated over an outer circumferential surface of the pipe-shaped insulator to achieve good finishing effect.

Technical Solution

In accordance with an aspect of the present invention, the above and other objects can be accomplished by the provision of an apparatus of manufacturing a pipe-shaped insulator comprising: a plurality of transportation rollers to transport a fiberglass mat drawn from a mat feeding roller; a coating roller to coat a binder over an upper surface of the fiberglass mat during transportation of the fiberglass mat; a forming roller on which the fiberglass mat, coated with the binder, is wound in plural times to form a pipe-shaped insulator having a predetermined thickness and a predetermined diameter; a squeeze roller used to appropriately press the fiberglass mat that is being wound on the forming roller so as to increase a density of the fiberglass mat and also, used to coat a binder over an outer circumferential surface of the wound fiberglass mat; a pressure regulator to adjust a winding pressure of the fiberglass mat by vertically moving the squeeze roller; an encoder to measure a drawn length of the fiberglass mat; a cutting unit to diagonally cut the fiberglass mat by means of a tilted circular cutter after a desired length of the fiberglass mat is drawn; an auxiliary roller and an auxiliary plate arranged above and below the cutting unit; an air cylinder to vertically move the auxiliary plate; a binder feeder to feed a binder to a surface of the squeeze roller; a drive chuck and a driven chuck separably coupled to the forming roller so as to rotate the forming roller; a control system, a sensor, and a plurality of drive motors and power transmission members, so as to enable standardization and manufacture of a high-density pipe-shaped insulator.

The drive chuck to be coupled to one end of the forming roller may be mounted on a pedestal by means of a shaft so as to be rotated by a motor and a power transmission member, and a driven chuck to be coupled to the other end of the forming roller may be mounted to an end of a rod of an air cylinder installed on another pedestal, the drive chuck and the driven chuck being separated from the forming roller for exchange of the forming roller.

The cutting unit may include: a pair of guide rods coupled to front and rear plates so as to be arranged horizontally in parallel; a mover coupled around the guide rods; a drive shaft and a driven shaft mounted at the front and rear plates respectively, and arranged in parallel; chain gears installed to the drive shaft and the driven shaft, respectively; a chain coupled with the chain gears; chain attachments coupled with the chain and secured to an upper position of the mover; a forward/reverse motor coupled to the rear plate; a power transmission member to connect a shaft rod of the forward/reverse motor to the drive shaft; an inverter motor mounted to the mover; a connecting plate mounted to a lower end slope of the mover and having a gradient of approximately 6.8 degrees; a shaft member fixed at the center of the connecting plate; a power transmission member to connect a shaft rod of the shaft member with a rotating shaft of the inverter motor; a circular cutter coupled to a lower end fastener of the shaft rod; left and right limit sensors to prevent excessive movement of the mover; and moving members secured to opposite positions of the chain and used to operate the left and right limit sensors.

The squeeze roller may be installed parallel to the forming roller so as to be rotated by the motor and the power transmission member, and a binder feeding box and the pressure regulator may be provided below the squeeze roller. The pressure regulator may include: vertical guide rods and ball screws provided at opposite sides of the binder feeding box; bevel gears coupled to lower portions of the ball screws; bevel gears engaged with the bevel gears and coupled to both ends of a shaft rod installed on pedestals; and a motor and a power transmission member to rotate the shaft rod.

Advantageous Effects

With an apparatus of manufacturing a pipe-shaped insulator according to the present invention, a high density pipe-shaped insulator having a remarkably improved strength and heat-insulation efficiency can be formed with low manufacturing costs. Further, a considerable reduction in production processes and lines and improved productivity via automation and standardization can be accomplished.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a configuration view illustrating an apparatus according to an embodiment of the present invention;

FIG. 2 is a front view of the apparatus shown in FIG. 1;

FIG. 3 is a view illustrating a cutting unit located at a position prior to cutting a fiberglass mat according to the present invention;

FIG. 4 is a view illustrating the cutting unit located at a position after cutting the fiberglass mat;

FIG. 5 is a sectional view illustrating a downwardly moved state of an auxiliary plate provided in the cutting unit according to the present invention;

FIG. 6 is a sectional view illustrating a state wherein the fiberglass mat is cut by the upwardly moved auxiliary plate of the cutting unit according to the present invention;

FIG. 7 is an enlarged view of the cutting unit according to the present invention;

FIG. 8 is a view illustrating a diagonally cut fiberglass mat according to the present invention; and FIG. 9 is a circuit block diagram of a control system according to an embodiment of the present invention.

BEST MODE FOR CARRYING OUT THE INVENTION

Hereinafter, preferred embodiments of the present invention will be described in detail with reference to the accompanying drawings. In the drawings, the same or similar elements are denoted by the same reference numerals even though they are depicted in different drawings. In the following description of the present invention, a detailed description of known functions and configurations incorporated herein will be omitted when it may make the subject matter of the present invention rather unclear.

FIG. 1 is a view illustrating the general configuration of an apparatus of manufacturing a pipe-shaped insulator according to an embodiment of the present invention. The apparatus of manufacturing a pipe-shaped insulator, which is designated by reference numeral 1, is designed to manufacture a pipe-shaped insulator having a predetermined thickness, diameter and length in such a manner that a fiberglass mat 2 is coated, at an upper surface thereof, with a binder (i.e. an adhesive) and is press-wound on a forming roller.

The pipe-shaped insulator manufacturing apparatus 1 according to the present invention generally includes: a mat feeding roller 3 which is used to feed a fiberglass mat 2; an idle roller 5 and a plurality of transportation rollers 6, 7 and 8 which are arranged at different positions and are used to transport the fiberglass mat 2 to a mat winding position on a forming roller 4; a coating roller 9 which is used to coat a binder over an upper surface of the fiberglass mat 2 and to transport the coated fiberglass mat 2; the forming roller 4 on which the fiberglass mat 2, coated with the binder, is wound in plural times to form a pipe-shaped insulator 12 having a predetermined thickness and a predetermined diameter; a squeeze roller 10 which is used to appropriately press the fiberglass mat 2 wound on the forming roller 4 and to coat a binder over an outer circumferential surface of the press-wound fiberglass mat 2; a pressure regulator 11 which is adapted to vertically move the squeeze roller 10 so as to regulate a winding pressure of the fiberglass mat 2; an encoder 13 which is used to measure a drawn length of the fiberglass mat 2; a cutting unit 14 which is used to diagonally cut the fiberglass mat 2 after an appropriate length of the fiberglass mat 2 is drawn, the diagonal cutting causing no angled edge along a cut line of the fiberglass mat 2; an auxiliary roller 15 and an auxiliary plate 16 which are provided downstream from a circular cutter 72 of the cutting unit 14 at positions above and below the circular cutter 72 and are used to assist diagonal cutting of the fiberglass mat 2; an air cylinder 17 which is used to move the auxiliary plate 16 upward when the circular cutter 72 diagonally cuts the fiberglass mat 2 so as to allow the auxiliary plate 16 to flatten the fiberglass mat 2; a binder feeder 18 which is used to feed a binder 22 to a surface of the coating roller 9; a drive chuck 31 and a driven chuck 35 which are separably coupled with the forming roller 4 and are used to rotate the forming roller 4; a control system 19 which controls the above mentioned constituent elements; and a plurality of drive motors, power-transmission members, and sensors (including sensing switches).

The fiberglass mat 2, wound on the mat feeding roller 3, is prepared by, for example, needle punching of continuous filaments to thereby have a thin thickness. However, note that a resultant insulator, made from the fiberglass mat 2, has a relatively large diameter as the thin fiberglass mat 2 is wound in plural layers. If a process of forming a pipe-shaped insulator begins, the fiberglass mat 2 is drawn from the mat feeding roller 3 and is transported by the plurality of transportation rollers 6, 7 and 8 and the coating roller 9. After the whole quantity wound on the mat feeding roller 3 is consumed, the used one is exchanged with a new mat feeding roller 3.

The mat feeding roller 3 is supported by a plurality of idle rollers 21 and in turn, the idle rollers 21 are mounted to side frames 20 such that they are spaced apart from one another by a predetermined interval. The idle rollers 21 have a slightly longer length than that of the mat feeding roller 3, to assure smooth rotation of the mat feeding roller 3. To assure easy exchange of the mat feeding roller 3, the side frames 20 and the idle rollers 21 are configured and arranged to surround only the bottom side and opposite lateral sides of the mat feeding roller 3.

The idle roller 5 is disposed in parallel above the mat feeding roller 3. The idle roller 5 serves to uniformly flatten the fiberglass mat 2 drawn from the mat feeding roller 3.

The lower transportation rollers 6 and 8, arranged downstream of the idle roller 5, are drive rollers to be rotated individually by a motor 23 and power transmission members 24 and 25. The transportation roller 7, disposed above the transportation roller 6, is a driven roller to be moved vertically by an air cylinder 26.

The air cylinder 26 serves to regulate a pressure (or distance) between the transportation rollers 6 and 7. The fiberglass mat 2 passes through a gap between the transportation rollers 6 and 7 to thereby be transported toward the forming roller 4.

The coating roller 9, disposed above the transportation roller 8, is a driven roller to be moved vertically by an air cylinder 26a. The air cylinder 26a serves to regulate a pressure (or distance) between the transportation roller 8 and the coating roller 9. The fiberglass mat 2 passes through a gap between the transportation roller 8 and the coating roller 9 to thereby be transported toward the forming roller 4.

The binder feeder 18 is located alongside the coating roller 9, to feed the binder 22 to the surface of the coating roller 9. With the binder feeder 18, an appropriate thickness of binder 22 is coated on an upper surface of the fiberglass mat 2.

Scrapers 27 and 28 are arranged, respectively, at one side of the coating roller 9 and above the coating roller 9. The scrapers 27 and 28 serve to regulate the coating amount of the binder 22, to allow a desired thickness of binder 22 to be attached to the surface of the coating roller 9. The binder 22 attached to the surface of the coating roller 9 is coated on the upper surface of the fiberglass mat 2 during transportation of the fiberglass mat 2. A distance (gap) between each scraper 27 or 28 and the coating roller 9 is appropriately regulated by use of elongated holes (not shown) perforated in fasteners.

In the above description, although the transportation roller 7 is located above the transportation roller 6, it will be appreciated that the transportation roller 6 may be located above the transportation roller 7.

In an alternative embodiment, the coating roller 9 may be located below the transportation roller 8 such that the binder 22 is coated over a lower surface of the fiberglass mat 2.

In another alternative embodiment, the binder feeder 18 may be installed alongside the transportation roller 8, to feed the binder 2 to a surface of the transportation roller 8. In this case, the scrapers 27 and 28 are installed, respectively, at one side of and above the transportation roller 8 such that the binder 22 can be attached to the surface of the transportation roller 8 to a predetermined thickness. With this configuration, the binder 22 is coated over the lower surface of the fiberglass mat 2 to a predetermined thickness.

The coating roller 9 can be moved vertically by the air cylinder 26a.

Additionally, a flat plate 29 having a predetermined width is arranged between the idle roller 5 and the transportation roller 6 in such a manner that the fiberglass mat 2 rubs past an upper surface of the flat plate 29. An encoder 13 is disposed above the flat plate 29, to sense a transported length (drawn length) of the fiberglass mat 2. The encoder 13 inputs the sensed result to the control system 19. After the fiberglass mat 2 is drawn to a predetermined length in consideration of a desired thickness of the press-formed pipe-shaped insulator, the cutting unit 14 diagonally cuts the fiberglass mat 2.

A mat detecting sensor 30 is provided near the encoder 13, to sense the presence of the fiberglass mat 2. If no fiberglass mat 2 is transported to the flat plate 29 as the whole quantity of the fiberglass mat 2 wound on the mat feeding roller 3 is consumed, the mat detecting sensor 30 senses the absence of the fiberglass mat 2, inputting the sensed result to the control system 19. The control system 19 stops the transportation rollers until a new mat feeding roller 3 is exchanged to restart the feeding (or drawing) of the fiberglass mat 2.

The encoder 13 is moved vertically by an air cylinder 3a on a pedestal 32. The air cylinder 3a moves the encoder 13 upward to allow passage of a tip end of the new fiberglass mat 2 and then, moves the encoder 13 downward after the tip end of the fiberglass mat 2 passes, so as to measure the transported length of the fiberglass mat 2.

The forming roller 4 is a tubular member coupled at opposite ends thereof with the drive chuck 31 and the driven chuck 35, both of the chucks 31 and 35 having a tapered configuration. With this configuration, the completely formed pipe-shaped insulator 12 can be easily separated from the drive chuck 31 and the driven chuck 35.

More specifically, the drive chuck 31, coupled to one end of the forming roller 4, is installed on a pedestal 32 and is rotated by a motor 33 and a power transmission member 34. The driven chuck 35, coupled to the other end of the forming roller 4, is installed to an end of a rod 37 of an air cylinder 36 installed on a pedestal 32. With operation of the drive chuck 31 and the driven chuck 35, the forming roller 4 can be rotated. The driven chuck 35 is coupled to or separated from the forming roller 4 as it is moved forward and rearward by the air cylinder 36.

After completing forming of the pipe-shaped insulator 12, the air cylinder 36 is operated as shown in FIG. 2 to move the driven chuck 35 rearward. Thereby, the forming roller 4, on which the formed pipe-shaped insulator 12 is disposed, is separated from the drive chuck 31. The separated forming roller 4 is moved into a drying chamber such that the pipe-shaped insulator 12 is subjected to drying and finishing processes. Thereafter, as the processed pipe-shaped insulator 12 is separated from the forming roller 4, manufacture of a high-density cylindrical pipe-shaped insulator 12 is completed.

In addition, prior to winding the fiberglass mat 2, a release agent is applied to an outer surface of the forming roller 4, or a vinyl sheet is wound on the outer surface of the forming roller 4, to assure easy separation of the pipe-shaped insulator 12 from the forming roller 4.

To prepare a new forming roller, first, one end of the new forming roller is coupled to the drive chuck 31, and the driven chuck 35 is moved forward by the air cylinder 36 so as to be coupled to the other end of the forming roller. If the new forming roller is completely prepared, the fiberglass mat 2 is transported such that it can be coated with the binder 22 and be press-formed after being wound on the forming roller 4. Then, with sequential processes of cutting, finishing, binder coating and forming roller separation, a new pipe-shaped insulator can be manufactured repeatedly.

The squeeze roller 10, disposed in parallel below the forming roller 4, is rotated by a motor 38 and a power transmission member 39. An elongated feeding box 40, in which the binder 22 is stored, is installed below the squeeze roller 10 such that a lower portion of the squeeze roller 10 is immersed in the binder 22. Thereby, the binder 22 can be attached to the squeeze roller 10.

Accordingly, if the squeeze roller 10 is rotated by the motor 38, the binder 22, attached to a surface of the squeeze roller 10, is coated over an outer circumferential surface of the wound fiberglass mat 2 on the forming roller 4. In this way, coating of the binder 22 is completed. The squeeze roller 10 is installed across both the pedestals 32 by means of shafts located at opposite sides of the pressure regulator 11.

The squeeze roller 10 can continuously press the fiberglass mat 2 by an appropriate pressure during winding of the fiberglass mat 2. Preferably, the squeeze roller 10 is spaced apart from the forming roller 4 by a distance slightly less than a final thickness (winding thickness) of the pipe-shaped insulator 12. With this arrangement, when the diagonally cut fiberglass mat 2, located between the circular cutter 72 and the forming roller 4, is finally wound, the fiberglass mat 2 is pressed by the squeeze roller 10 so as to allow the binder 22 to sufficiently permeate the fiberglass mat 2 wound on the forming roller 4. Thereby, the fiberglass mat 2 can achieve an increased density and enhanced attachment force, and the binder 22 can be coated over the outer circumferential surface of the pipe-shaped insulator 12 to provide good finishing effect.

Preferably, the motor 38 is controlled such that it can be rotated only until the diagonally cut fiberglass mat 2 is completely formed through transportation and winding processes, rather than being continuously rotated.

The vertical movement distance, i.e. the height of the binder feeding box 40 is determined by the pressure regulator 11 on the basis of a desired thickness of the press-formed pipe-shaped insulator. The pressure regulator 11 includes vertical guide rods 41 and 42 and ball screws 43 and 44 provided at opposite sides of the binder feeding box 40, bevel gears 45 and 46 coupled to lower portions of the ball screws 43 and 44, bevel gears 48 and 49 engaged with the bevel gears 45 and 46 and coupled to both ends of a shaft rod 47 installed on the pedestals 32, and a motor 50 and a power transmission member 51 to rotate the shaft rod 47.

The forming roller 4 and the squeeze roller 10 are rotated in opposite directions from each other by the respective motors 33 and 38, whereby the fiberglass mat 2 can be wound on the forming roller 4 without overload even if a winding diameter of the fiberglass mat 2 (i.e. the final diameter of the resulting pipe-shaped insulator) increases.

With a press force of the squeeze roller 10, the density of the fiberglass mat 2 and the permeation rate of the binder 22 can be enhanced. Specifically, the fiberglass mat 2 can achieve an improvement in physical solidity and density under the influence of the binder 22, and is free from breakage even at high temperatures, achieving an extended lifespan.

Indicating needles 83 are provided at opposite sides of the binder feeding box 40, and scales 82 are provided at upright panel portions of the pedestals 32. Therefore, an operator can easily observe or regulate the height of the squeeze roller 10 on the basis of the forming thickness of the pipe-shaped insulator 12. The binder feeding box 40 is provided at the bottom thereof with an outlet, which is provided with a valve, for the purpose of cleaning.

Since the amount of the binder 22 stored in the binder feeding box 40 is gradually reduced during use, the binder 22 may be supplemented by the operator, or a flow-rate regulator consisting of a pump, flow-rate sensor and supplement source, may be provided to automatically supplement the binder 22.

Now, the detailed configuration of the cutting unit 14 will be described. The cutting unit 14 includes: a pair of guide rods 54 and 55 which are coupled to front and rear plates 52 and 53 so as to be arranged horizontally in parallel; a mover 56 which is coupled around the guide rods 54 and 55 so as to move along the guide rods 54 and 55; a drive shaft 57 and a driven shaft 58 which are mounted at the front and rear plates 52 and 53, respectively, and are arranged in parallel; chain gears 59 and 60 which are provided, respectively, at one end of the drive shaft 57 and the driven shaft 58; a chain 62 coupled with the chain gears 59 and 60; chain attachments 61 which are coupled with the chain 62 and are secured to upper locations of the mover 56; a forward/reverse motor 65 which is coupled to the rear plate 63; a power transmission member 64 which connects a rotating shaft of the forward/reverse motor 65 with the drive shaft 57; an inverter motor 63 which is mounted to the mover 56; a connecting plate 67 which is mounted to a lower end slope 66 of the mover 56 and is kept at a desired gradient θ; a shaft member 69 which is fixed at the center of the connecting plate 67; a power transmission member 70 which connects a shaft rod 68 of the shaft member 59 with a rotating shaft of the inverter motor 63; the circular cutter 72 which is coupled to a lower end fastener 71 of the shaft rod 68; left and right limit sensors 73 and 74 which serve to prevent excessive movement of the mover 56; and moving members 75 and 76 which are secured to opposite positions of the chain 62 and are used to operate the left and right limit sensors 73 and 74. As shown in FIG. 8, the gradient θ of the connecting plate 67 and the circular cutter 72 from a horizontal plane is approximately 6.8 degrees with respect to a discharge direction of the fiberglass mat 2 and thus, a diagonally cut plane P of the fiberglass mat 2 obtained by the circular cutter 72 has a gradient of approximately 6.8 degrees.

The pair of left and right limit sensors 73 and 74 are configured to rapidly reduce a movement speed of the mover 56 when the mover 56 trips an inner one of the limit sensors, and to stop the mover 56 when the mover 56 trips an outer one of the limit sensors.

The circular cutter 72 is provided, at a cutter edge portion, i.e. at a blade portion thereof, with diamond, and thus, is free from a risk of abrasion and does not become dull even after long term use.

In the present invention, as shown in FIG. 8, the fiberglass mat 2 obtains the diagonally cut plane P by diagonal cutting of the above-described cutting unit 14, and the diagonally cut plane P has a length (width) 6-10 times the thickness t of the fiberglass mat 2. With the diagonally cut plane P, there remains no angled portion at a winding ending portion of the wound fiberglass mat 2, i.e. the pipe-shaped insulator, and therefore, the formed pipe-shaped insulator 12 has smooth beginning and ending portions having no angled portions. Although it is changed according to the thickness t of the fiberglass mat 2, if the thickness t is 15 mm, the width L of the diagonally cut plane P is approximately 100 mm.

A tilting plate 77 is installed downstream of the transportation roller 8 and is used to regulate a gradient of the fiberglass mat 2.

Before the fiberglass mat 2 is wound on a surface of the newly exchanged forming roller 4, the tilting plate 77 temporarily supports a fiberglass mat 2a which is ready to be wound on the surface of the forming roller 4 by the operator.

As shown in FIG. 6, the tilting plate 77 is provided at one end thereof with a shaft pin 77a. The tilting plate 77 is installed to an arcuate mount 32 such that the arcuate mount 32 defines a circle centered on the shaft pin 77a. The arcuate mount 32 has a plurality of through-holes 78 longitudinally spaced apart from another by a predetermined interval. As a pin 80 is fastened through a hole perforated in the other end of the tilting plate 77 and one of the plurality of through-holes 78, a tilting angle of the tilting plate 77 can be appropriately regulated. An idle roller 79 is provided between the transportation roller 8 and the tilting plate 77 and is used to flatten the fiberglass mat 2a to be transported to the tilting plate 77.

The auxiliary plate 16 is formed at an upper surface thereof with a recess 16a and a slope 16b, to receive an edge of the circular cutter 72. The gradient of the slope 16b is equal to or similar to the gradient θ of the circular cutter 72.

Accordingly, the upper surface of the fiberglass mat 2 is kept in a flattened state by operation of the auxiliary roller 15 and therefore, it is possible to prevent the fiberglass mat 2 from fluctuating or being deviated laterally (i.e. in a cutting direction) upon cutting of the fiberglass mat 2. In this case, the auxiliary plate 16 serves as a cutting die (cutting plate) of the fiberglass mat 2. That is, the auxiliary plate 16 can not only prevent drooping of the fiberglass mat 2, but also guide the circular cutter 72 during movement of the circular cutter 72.

A rod end of the air cylinder 17 is fixed to the bottom of the auxiliary plate 16, to cause vertical movement of the auxiliary plate 16. For example, during movement and forming of the fiberglass mat 2, as shown in FIG. 6, the auxiliary plate 16 is moved downward by the air cylinder 17, assuring smooth movement of the fiberglass mat 2. Also, while the fiberglass mat 2 is diagonally cut by the circular cutter 72 (the fiberglass mat 2 is in a stationary state), as shown in FIGS. 5 and 7, the auxiliary plate 16 is moved upward by the air cylinder 17, so as to uniformly flatten the fiberglass mat 2 in cooperation with the auxiliary roller 15.

Then, as shown in FIG. 3, the forward/reverse motor 65 of the cutting unit 14, located outside of the fiberglass mat 2, is rotated upon receiving power and simultaneously, the circular cutter 72 is rotated as power is applied to the inverter motor 63.

If the forward/reverse motor 65 is rotated forward, the chain 62 is circulated counter-clockwise, and the mover 56 is advanced toward the drive shaft rod 57 by the chain attachments 61 coupled to the chain 62. Thereby, as shown in FIGS. 4 and 8, the fiberglass mat 2 is diagonally cut by the circular cutter 72 mounted to the mover 56.

If the mover 56, completing the diagonal cutting of the fiberglass mat 2, accesses the limit sensor 74 via continuous movement thereof, the control system 19 intercepts supply of power to the forward/reverse motor 65 and the inverter motor 63, whereby movement of the mover 56 is stopped and rotation of the circular cutter 72 is stopped.

Simultaneously with stoppage of the mover 56, reverse power is supplied to the forward/reverse motor 65. Thereby, as the forward/reverse motor 65 is rotated in reverse, the chain 62 is rotated clockwise and the mover 56 is retreated toward the driven shaft rod 58. If the moving member 76 coupled to the chain 62 accesses the limit sensor 73, supply of power to the forward/reverse motor 65 is intercepted until the following diagonal cutting, and the mover 56 is stopped. The circular cutter 72 is rotated only while the mover 56 is advanced for cutting of the fiberglass mat 2.

FIG. 9 is a circuit block diagram of the control system 19 according to an embodiment of the present invention.

The control system 19 includes a control part C, consisting of a Central Processing Unit (CPU), PLC, etc. A variety of data, including a drawn length and drawing rate of the fiberglass mat 2, a winding thickness and winding rate of the fiberglass mat 2, a cutting rate of the fiberglass mat 2, On/Off states, rotating speed and rotating direction of motors, operating speeds of the air cylinders 13a, 17, 26, 26a and 36, a coating amount of the binder 22, a press force of the squeeze roller 10 (a distance between the squeeze roller 10 and the forming roller 4), etc., is input to an input side of the control part C. The control system 19 further includes a setting part S which consists of a keypad capable of setting, for example, operating conditions and operating modes, a resetter that is reset upon malfunction of the control system 19, etc. In addition, the encoder 13 used to measure the transportation distance of the fiberglass mat 2, the mat detecting sensor 30 to sense the presence of the fiberglass mat 2, the limit sensors 73 and 74 to limit excessive transportation of the circular cutter 72, and a foot switch 81 to allow the operator to manipulate the transportation of the fiberglass mat 2 with his/her foot are connected to the control part C.

Connected to an output side of the control part C are a display part D to display setting values (control values), current values/operating conditions/alarm lights, etc., an alarm part A to warn of abnormal conditions audibly and/or with lights, the motors 23, 33, 38, 50, 63, 65, and solenoid valves V to control the air cylinders.

In the control system 19, the CPU or PLC may be replaced by a sequence circuit. The display part D includes a power display lamp to display the supply of power, an operating display lamp to display whether or not the motors and air cylinders are in operation, an alarm lamp to display various abnormal conditions, and other display elements to display various data. The display part D may be realized by any one of a liquid crystal display (LCD), seven segments and light emitting diodes, or combinations thereof. Of course, as occasion demands, the display part D may take the form of a touch screen, to enhance the convenience of use.

The alarm part A generates alarm signals upon overload of the motors 23, 33, 38, 50, 63 and 65, breakage of wire, short circuit, abnormal drawing of the fiberglass mat 2, malfunction of the air cylinders, etc.

Considering the operation of the pipe-shaped insulator manufacturing apparatus 1 in brief, a predetermined length of the fiberglass mat 2 to be wound on the forming roller 4 has been drawn on the basis of a thickness of the fiberglass mat 2, and the fiberglass mat 2 is subjected to binder coating and diagonal cutting prior to being wound on the forming roller 4. The diagonal cutting of the fiberglass mat 2 is performed by the tilted circular cutter 72. With the diagonal cutting, the resulting fiberglass mat 2 can be smoothly press-formed on the forming roller 4 without causing any angled portions at winding beginning and ending portions thereof, whereby the high quality pipe-shaped insulator 12 having no angled and stepped portions at inner and outer circumferential surfaces thereof can be manufactured.

In the present invention, the drawn length or transported length of the fiberglass mat 2, measured by the encoder 13, is input to the control system 19 to thereby be compared with a preset reference forming length. If the measured length coincides with the reference forming length, the control system 19 stops rotation of the transportation rollers. Thereby, transportation of the fiberglass mat 2 is stopped, and the stationary fiberglass mat 2 is diagonally cut by operation of the cutting unit 14 as shown in FIG. 8.

If the operator activates the foot switch 81 with his/her foot after the diagonal cutting of the fiberglass mat 2 is completed, the diagonally cut fiberglass mat 2 is transported again. The diagonal cut plane P of the fiberglass mat 2 is coated with the binder by operation of the squeeze roller 10. Then, if the fiberglass mat 2 is press-wound on the forming roller 4, the forming of the pipe-shaped insulator 12 is completed. In this case, a next diagonally cut fiberglass mat 2a is transported to and disposed on the tilting plate 77.

In a state wherein rotation of the forming roller 4 is stopped after completion of forming, if the operator operates the air cylinder 36 to retreat the driven chuck 35 while keeping the forming roller 4 in a stationary state, the forming roller 4 is separated from the drive chuck 31 and the driven chuck 35. The separated forming roller 4 is moved into the drying chamber, whereby the press-formed pipe-shaped insulator 12 wound on the forming roller 4 is subjected to drying, finishing and packing in sequence.

Then, after one end of a new forming roller, on which no fiberglass mat 2 is wound, is coupled to the drive chuck 31, the driven chuck 35 is advanced by operation of the air cylinder 36 so as to be coupled to the other end of the new forming roller. In this way, installation of the new forming roller is completed.

After completing installation of the new forming roller, the fiberglass mat 2a disposed on the tilting plate 77 is attached to the forming roller 4, whereby mass production of the pipe-shaped insulator 12 can be accomplished via repetitive press-winding, forming and cutting processes as described above. A winding beginning portion of the fiberglass mat 2 wound on the forming roller 4 becomes the diagonally cut plane P coated with the binder and therefore, the resulting pipe-shaped insulator 12 has no angled portions at both inner and outer circumferential surfaces thereof.

Although the present invention describes that the gradient θ of the circular cutter 72 is approximately 6.8 degrees, of course, the gradient θ can be appropriately increased or decreased according to situations. For example, the gradient θ can be deviate from the angle of 6.8 degrees by ±5 degrees to ±10 degrees.

As the fiberglass mat 2 is diagonally cut by a gradient of approximately 6.8 degrees corresponding to the gradient θ of the circular cutter 72 and the diagonally cut plane P is finally bonded to the surface of the wound fiberglass mat 2, the outer circumferential surface of the pipe-shaped insulator 12 has no angled portion.

In the present invention, the binder 22 stored in the binder feeding box 40 is kept at normal temperature. As occasion demands, a temperature sensor to sense the temperature of the binder 22 is provided and additionally, a thermostat to be controlled by the control system 19 is provided near the binder feeding box 40, whereby the temperature of the binder 22 can be continuously kept at a preset temperature.

Conventionally, a binder feeding vessel is located below a fiberglass mat being moved, i.e. is located near the drive roller such that the binder is coated over an upper surface of the fiberglass mat. This configuration, however, necessitates a twister to twist the fiberglass mat into an S-shaped form, complicating the overall configuration of the manufacturing apparatus and resulting in deterioration in workability and productivity. With the present invention, the upper surface of the fiberglass mat 2 can be sufficiently coated with the coating roller 9 located above the fiberglass mat 2 and therefore, there is no need for the above-described twister.

In the present invention, respective separate processes, which have conventionally been implemented separately, can be collectively and sequentially implemented using a single manufacturing apparatus, whereby a simplification in a production line can be accomplished, achieving improvement in workability and productivity as well as reduction in installation space.

The pipe-shaped insulator manufacturing apparatus 1 of the present invention is provided at the bottom thereof with the foot switch 81 to be manipulated by the operator's foot. Using the foot switch 81 allows the operator free use of their hands, resulting in a significant increase in operation convenience.

Also, the pipe-shaped insulator 12 manufactured by the present invention can exhibit excellent heat-insulation efficiency even with a thin thickness thereof by virtue of light-weight characteristic of fiberglass.

Although the present invention describes the forming of the pipe-shaped insulator using the fiberglass mat, of course, various diameters and thicknesses of pipe-shaped insulators can be formed using a variety of inorganic fiber mats rather than the fiberglass mat.

INDUSTRIAL APPLICABILITY

As apparent from the above description, the present invention provides an apparatus of manufacturing a pipe-shaped insulator having the following effects.

First, according to the present invention, a fiberglass mat is coated with a binder during transportation thereof and is press-wound on a forming roller so as to manufacture a high-density cylindrical pipe-shaped insulator. The resulting pipe-shaped insulator has advantages of reduced manufacturing costs and excellent heat-insulation. Also, the pipe-shaped insulator is a standard product suitable for automatic assembly.

Second, a series of processes are implemented in the single manufacturing apparatus, resulting in a remarkable reduction in the length of production line and improvement of productivity via automation and standardization.

Third, as compared to the prior art which is labor and intensive and deteriorates productivity due to manual cutting of a fiberglass mat using cutting tool, according to the present invention, a fiberglass mat can be diagonally cut to a preset length by a circular cutter so as to remain a wide-width diagonal cut plane. Therefore, the present invention can achieve improved productivity up to approximately 50% when compared to conventional manual cutting methods.

Fourth, when the fiberglass mat is coated at an upper surface thereof with the binder and is press-formed, the fiberglass mat can achieve an increase not only in chemical coupling force of plural winding layers of the fiberglass mat, but also physical coupling force caused by press force of a squeeze roller. Accordingly, the fiberglass mat has no risk of unwinding even at high temperature and can achieve an extended lifespan.

Fifth, upon cutting of the fiberglass mat, the fiberglass mat can be delicately cut in a diagonal direction using the circular cutter and therefore, no angled portion occurs at a winding ending portion of the pipe-shaped insulator. Furthermore, a winding beginning portion of the pipe-shaped insulator defines a diagonal cut plane, causing no angled portion at an inner circumferential surface of the pipe-shaped insulator. This assures mass production of high-quality products.

Sixth, when the fiberglass mat is cut using the circular cutter, a uniform cutting plane and rapid cutting of the fiberglass mat can be accomplished with assistance of an auxiliary roller and an auxiliary plate, and consequently, an improved cutting efficiency can be accomplished.

Seventhly, the pipe-shaped insulator according to the present invention can achieve an increased density by press force applied during forming and have a perfect cylindrical shape having no angled portion. Therefore, the present invention can achieve products having no risk of deformation so long as no external force is applied.

Eighth, with the use of an inexpensive forming roller, the present invention can reduce manufacturing costs of the pipe-shaped insulator. Further, according to the present invention, assembly of the pipe-shaped insulator via an automated line is possible and the pipe-shaped insulator can be easily installed around target piping.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. An apparatus of manufacturing a pipe-shaped insulator comprising:
   a mat feeding roller on which a fiberglass mat is wound;
   a plurality of transportation rollers to transport the fiberglass mat drawn from the mat feeding roller;
   a coating roller to coat a binder over a surface of the fiberglass mat during transportation of the fiberglass mat;
   a forming roller on which the fiberglass mat, coated with the binder, is wound in plural times to form a pipe-shaped insulator having a predetermined thickness and a predetermined diameter;
   a squeeze roller disposed parallel to the forming roller and adapted to be rotated by a motor and a power transmission member; a binder supply means, adapted to supply the binder to the squeeze roller for coating onto the fiberglass mat;
   a pressure regulator to vertically move the squeeze roller so as to press the fiberglass mat being wound on the forming roller and to enable coating of the binder on the fiberglass mat;
   an encoder to measure a transported length of the fiberglass mat;
   a cutting unit to be moved to a cutting position so as to diagonally cut the fiberglass mat after a desired length of the fiberglass mat is transported and then, to be returned to an original position hereof after completing the diagonal cutting of the fiberglass mat; and
   a control system, a sensor, and a plurality of drive motors and power transmission members.

2. The apparatus according to claim 1, wherein an auxiliary roller and an auxiliary plate are provided above and below the cutting unit, respectively, and the auxiliary plate is moved vertically by an air cylinder.

3. The apparatus according to claim 2, wherein a drive chuck to be coupled to one end of the forming roller is mounted on a pedestal by means of a shaft so as to be rotated by a motor and a power transmission member, and a driven chuck to be coupled to the other end of the forming roller is mounted to an end of a rod of an air cylinder installed on another pedestal.

4. The apparatus according to claim 2, wherein the cutting unit includes:
   a pair of guide rods coupled to front and rear plates so as to be arranged horizontally in parallel;
   a mover coupled around the guide rods;
   a drive shaft and a driven shaft mounted at the front and rear plates respectively, and arranged in parallel;
   a chain coupled with chain gears of the drive shaft and the driven shaft;
   chain attachments of the mover coupled with the chain;
   a forward/reverse motor coupled to the rear plate and used to rotate the driver shaft forward and reverse in cooperation with a power transmission member;
   an inverter motor mounted to the mover;
   a connecting plate mounted to a lower end slope of the mover;
   a shaft member fixed at the center of the connecting plate;
   a power transmission member to connect a shaft rod of the shaft member with a rotating shaft of the inverter motor;
   a circular cutter coupled to a lower end fastener of the shaft rod and having a predetermined gradient;
   left and right limit sensors to prevent excessive movement of the mover; and
   moving members secured to opposite positions of the chain and used to operate the left and right limit sensors.

5. The apparatus according to claim 4, wherein the gradient of the circular cutter is 6.8 degrees.

6. The apparatus according to claim 2, wherein a binder feeding box is provided below the squeeze roller, rotated by the motor and the power transmission member, so as to be moved vertically by the pressure regulator.

7. The apparatus according to claim 2, wherein the pressure regulator includes: vertical guide rods and ball screws provided at opposite sides of the binder feeding box; bevel gears coupled to lower portions of the ball screws; bevel gears engaged with the bevel gears and coupled to both ends of a shaft rod installed on pedestals; and a motor and a power transmission member to rotate the shaft rod.

8. The apparatus according to claim 2, wherein a tilting plate is installed downstream of the transportation roller, to adjust a gradient of the fiberglass mat.

9. The apparatus according to claim 1, wherein a drive chuck to be coupled to one end of the forming roller is mounted on a pedestal by means of a shaft so as to be rotated by a motor and a power transmission member, and a driven chuck to be coupled to the other end of the forming roller is mounted to an end of a rod of an air cylinder installed on another pedestal.

10. The apparatus according to claim
wherein the cutting unit includes:
   a pair of guide rods coupled to front and rear plates so as to be arranged horizontally in parallel;
   a mover coupled around the guide rods;
   a drive shaft and a driven shaft mounted at the front and rear plates respectively, and arranged in parallel;
   a chain coupled with chain gears of the drive shaft and the driven shaft;
   chain attachments of the mover coupled with the chain;
   a forward/reverse motor coupled to the rear plate and used to rotate the driver shaft forward and reverse in cooperation with a power transmission member;
   an inverter motor mounted to the mover;
   a connecting plate mounted to a lower end slope of the mover;
   a shaft member fixed at the center of the connecting plate;
   a power transmission member to connect a shaft rod of the shaft member with a rotating shaft of the inverter motor;
   a circular cutter coupled to a lower end fastener of the shaft rod and having a predetermined gradient;
   left and right limit sensors to prevent excessive movement of the mover; and
   moving members secured to opposite positions of the chain and used to operate the left and right limit sensors.

11. The apparatus according to claim 1, wherein a binder feeding box is provided below the squeeze roller, rotated by the motor and the power transmission member, so as to be moved vertically by the pressure regulator.

12. The apparatus according to claim 1, wherein the pressure regulator includes: vertical guide rods and ball screws provided at opposite sides of the binder feeding box; bevel gears coupled to lower portions of the ball screws; bevel gears engaged with the bevel gears and coupled to both ends of a shaft rod installed on pedestals; and a motor and a power transmission member to rotate the shaft rod.

13. The apparatus according to claim 1, wherein a tilting plate is installed downstream of the transportation roller, to adjust a gradient of the fiberglass mat.

* * * * *